United States Patent [19]
Aurich

[11] Patent Number: 5,957,614
[45] Date of Patent: Sep. 28, 1999

[54] CONNECTING SYSTEM FOR CONSTRUCTING ACCOMMODATION UNITS AND ASSEMBLING FURNITURE

[75] Inventor: Winfried Aurich, Dresden, Germany

[73] Assignee: Lignum GmbH, Dresden, Germany

[21] Appl. No.: 08/824,645

[22] Filed: Mar. 24, 1997

Related U.S. Application Data

[63] Continuation of application No. PCT/DE95/01304, Sep. 21, 1995.

[51] Int. Cl.⁶ ........................................... F16B 7/04
[52] U.S. Cl. .......................... 403/170; 403/218; 248/243
[58] Field of Search ..................... 403/217, 218, 403/219, 169, 170, 174, 175, 177, 178, 49; 248/243, 235, 223.41, 225.11, 690, 220.22, 230.1

[56] References Cited

U.S. PATENT DOCUMENTS

| | | | |
|---|---|---|---|
| 2,788,949 | 4/1957 | Gurries | 248/243 X |
| 2,909,353 | 10/1959 | McLean . | |
| 2,936,147 | 5/1960 | Stewart | 248/243 |
| 3,323,820 | 6/1967 | Braccini | 403/218 |
| 3,834,549 | 9/1974 | Burg et al. | 403/218 X |
| 3,985,083 | 10/1976 | Pofferi | 403/381 X |
| 4,348,129 | 9/1982 | Conforti | 403/218 |
| 4,355,918 | 10/1982 | Van Vliet | 403/218 X |
| 4,448,378 | 5/1984 | Binfare | 403/217 X |
| 4,982,546 | 1/1991 | Lange | 403/178 X |
| 5,356,234 | 10/1994 | Vangool | 403/170 |
| 5,797,695 | 8/1998 | Prusmack | 403/170 |

FOREIGN PATENT DOCUMENTS

| | | | |
|---|---|---|---|
| 214099 | 3/1961 | Austria | 248/243 |
| 0 126 657 | 11/1984 | European Pat. Off. . | |
| 1 264 529 | 3/1961 | France . | |
| 2539827 | 7/1984 | France | 403/217 |
| B 16 09 419 | 10/1971 | Germany . | |
| U 89 12 144 | 11/1989 | Germany . | |
| U 92 11 330 | 2/1993 | Germany . | |
| 546 873 | 3/1974 | Switzerland . | |
| 1477867 | 5/1989 | U.S.S.R. | 403/170 |
| 2 140 058 | 11/1984 | United Kingdom . | |
| 2 208 265 | 3/1989 | United Kingdom . | |
| 8903461 | 4/1989 | WIPO | 403/218 |

*Primary Examiner*—Harry C. Kim
*Attorney, Agent, or Firm*—Darby & Darby

[57] ABSTRACT

The invention provides for a connection system for structurally connecting horizontal frame members and vertical supports. The system includes connector pairs and supports, frame members and connector pairs for accommodating the frame members and the supports. The connector pair has an axial bore for accommodating a connection screw and the supports include a threaded bushing in the end section for accepting the connection screw. The cylindrical connector pair has notches, adapted to accept the frame members. The cylindrical connector pair includes a plurality of vertical bores circumferencially arranged about the axial bore. The frame members include in the connection section a locking element, the locking element is adapted to fit into one of the bores of the connector pair. The connector pair, the frame members and the supports are structurally connected by tightening connection screw in the threaded bushings.

20 Claims, 13 Drawing Sheets

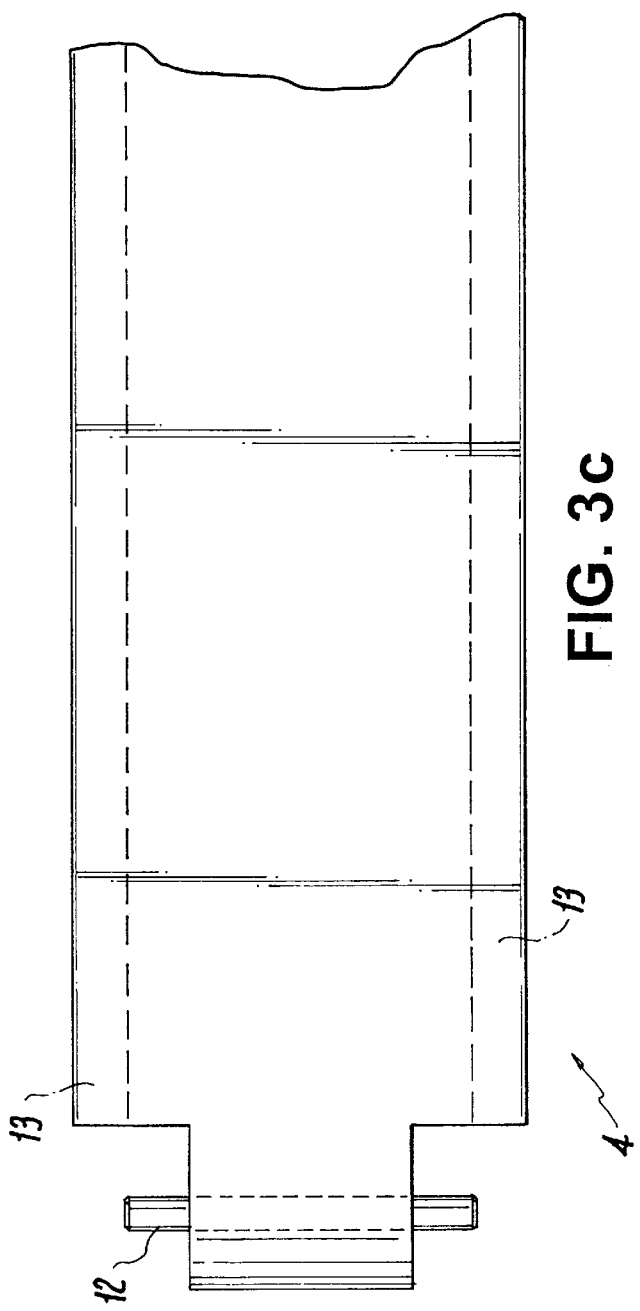
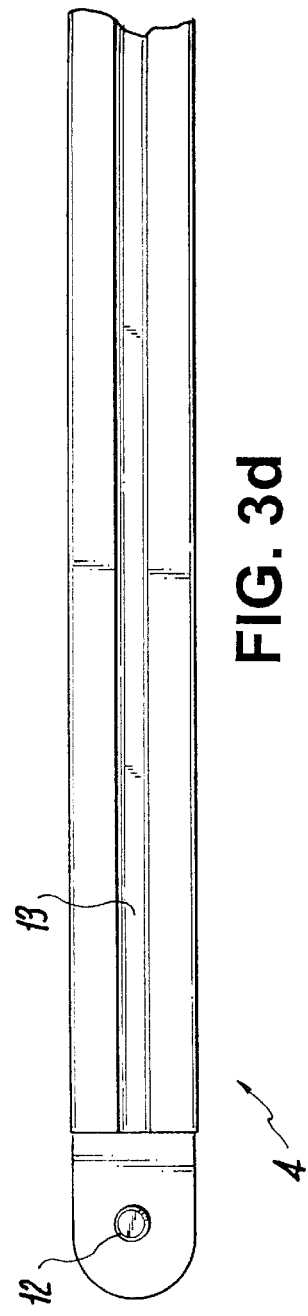
FIG. 3c
FIG. 3d

CONNECTING SYSTEM FOR CONSTRUCTING ACCOMMODATION UNITS AND ASSEMBLING FURNITURE

This is a continuation of international application Ser. No. PCT/DE95/01304, filed Sept. 21, 1995, the disclosure of which is hereby incorporated by reference.

BACKGROUND OF THE INVENTION

The invention relates to a connection system or assembly system, respectively, whose demountable components may also be made of wood and which is intended, in particular, for the construction of accomodation units and assembled furniture as well as for complex configurations for interior design plans (shop-in-shop systems) and exhibitions.

Demountable components for the construction of accomodation units and assembled furniture are usually made of metal parts. These metal parts involve high manufacturing effort. Frequently, they are very heavy and have no or only minor decorative effect with construction details often undesirably visible.

From DE 39 33 845 A1, a framework joint is known for the detachable jointing of a support element having a recess at its front end with at least one purlin element, via a support head. The support head has a body element whose shape, at least partly, corresponds with the shape of the recess in the support element. The subsequent flange element has one or several connection elements projecting in the opposite direction of the body element, which can be engaged with a purlin joint plate protruding from the front end of the purlin element. This approach features a complex structure connected with high assembly or disassembly, respectively, efforts.

In G 92 11 330.3 a flexible wood component is described which is designed for the construction of accomodation units and assembled furniture. This wood component consists in a connection joint with up to 8 frame couplings, supports, connection screws, cover plates and base elements. On assembly the frame elements or the horizontal girders are only hung in the connection joint using one-sided dowels.

A decisive disadvantage of this approach is the danger that the frame element will be sheared off at the resting point. Due to the one-sided rest of the frame element the joint does not hold angles; despite of the high material expenditure also the total stability is unsatisfactory.

In EP-A-0126657 a connection joint is described which is characterized particularly by its metallic assembly elements.

The connector is tubular, horizontally divided, and the tube walls have slots starting from the plane of division.

The frame elements are hung in these slots and bears against a dovetail recess on the inner wall of the tubular connector.

To clamp the connection joint a through screw, which cooperates with a separate clamping device, passes axially through both tube sections of the connector.

Based on this state-of-the-art, it is the object of the invention to eliminate the above drawbacks and to extend the functionality and therewith the application range of those connection or assembly systems. Additionally, a connection system is intended which, even if the demountable components are made of wood, balances the disadvantage of the wood's low strength in spite of minimal dimensions of the constructional parts.

SUMMARY OF THE INVENTION

According to the invention, this problem is solved by providing a connection system for structurally connecting horizontal frame members and vertical supports by providing cylindrical connector pairs. The cylindrical connector pairs are adapted to accommodate the frame members and the supports. Further, the connector pairs have a common axial bore for accommodating a connection screw. The supports include a threaded bushing in the end section for accepting the connection screw. The cylindrical connector pairs have a plurality of notches, which are adapted to accept the frame members. The cylindrical connector pairs include a plurality of vertical bores circumferencially arranged about the axial bore and the frame members include in the connection section a locking element. The locking element is adapted to fit into one of the vertical bores of the connector pair. The cylindrical connector pair, the horizontal frame members and the supports are structurally connected by tightening the connection screw in the threaded bushings frame members and the supports are structurally connected by tightening the connection screw in the threaded bushings.

Sturdy connection of the skeleton structure of the connection system is reached by the pressing pressure of the supports acting on the frame elements, which are anchored in the connector by means of the connection screw.

In addition, the plate elements, which are mounted between the frame elements, for example by tongue and groove, or the two-sidedly supported consoles suspended between functional supports, provide the necessary angular stability.

The characteristic feature of the connectors according to the invention is that they are horizontally divided and that up to 8 recesses with holes and longitudinal grooves can be made on the opposite inner sides of the connector halves to accomodate and adjust the frame elements. Each frame element has matching notches on both resting ends and is inserted in the associated bores of the connector halves by means of a, for example, pin-like locking element which extends through the part remaining after notching and projects on both sides of it.

According to the present invention, a constructional principle has been created which offers extended applications also if made of wood with the wood's strength values. Assembly and disassembly can be done extremely simply and rapidly with a durability if made of wood approximately equivalent to that if made of metal components.

The connection system according to the invention can be horizontally extended without limits, and can be vertically raised until the static stressability has been reached. Up to 8 frame elements can be jointed to a connector in one plane. This allows configurations up to octagonal constructions.

In addition to spatial constructions assembled of wall building components, reception desks, tables, platforms, cabinets, shelves, showcases, benches etc., can be assembled.

The present invention also provides for an extension of the connection system with functional and aesthetically appealing plate elements.

The functionality of the connection system can, as described below, further be extended by the construction, according to the invention, of functional supports inserted in particular sections of the frame structure.

These functional supports can be designed, first, such that they have a longitudinal slot which divides the solid support over its full length or over sections and is located between the threaded bushings in the front ends of the functional supports (for screwing with the connectors). In the range of the longitudinal slot or the longitudinal division, for example, pin-like couplers are fitted vertically to the longitudinal axis of the functional support at grid positions, which connect the halves of the functional support each to the other.

Furthermore, the functional supports can be longitudinally divided to form two halves of any crosssection, which are spaced from each other and connected by the pin-like couplers. Again, the threaded bushings for the assembly with the connectors are inserted in the front ends. One or several consoles or other holding devices can be vertically adjustably slided into the longitudinal slot of the functional support and subsequently be hung in and fixed using the couplers.

It follows that the width of the longitudinal slot or the distance between the two halves of the functional support, respectively, must correspond with the thickness of the consoles or other holding devices in the sliding area.

The consoles can be hung in functional supports one-sidedly or two-sidedly; they are intended to bear, among other things, shelves, rails and cabinet components.

Any console which has been slided in the longitudinal slot, is locked using indents which are made in the ends of the console. The one-sided console has, on the assembly side, two indents for a given angular position of the console and three indents to select one of two given angular positions of the console.

The two-sidedly suspended console must have only one indent on each end of the console. The free lengths (outside the areas where the consoles are slided in the longitudinal slots of the functional supports) of these two-sidedly suspended consoles can carry additional riding elements to balance for height differences and ensure certain functions.

Instead of consoles, ring mounts as punctual supporting elements can be fitted over the whole length of the functional supports. They slide on the functional support and thus, can be vertically adjusted. They are locked on the desired height of the functional support by means of a bolt, which transversely passes through the ring mount and the longitudinal slot of the functional support and which, in analogy to the consoles described, engages with the associated coupler by means of an indent on its lower side when pushed in place.

In assembled condition the locking bolt passes through the longitudinal slot of the functional support and engages with the wall of the ring mount opposite to the bolt handle. Bores are in the ring mount in which, for examples, clothes rails can be put.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views:

FIGS. 3A, 3B, 3C, 3D shows the front and top views of a connector with frame element.

In the presently preferred embodiments shown in FIGS. 1 to 5, all components of the connection system, with the exception of the connection screw 3 and threaded bushing 1, are made of wood as the material but, of course, other suitable materials may also be used.

DESCRIPTION OF THE PRESENTLY PREFERRED EMBODIMENTS

Figure 1:
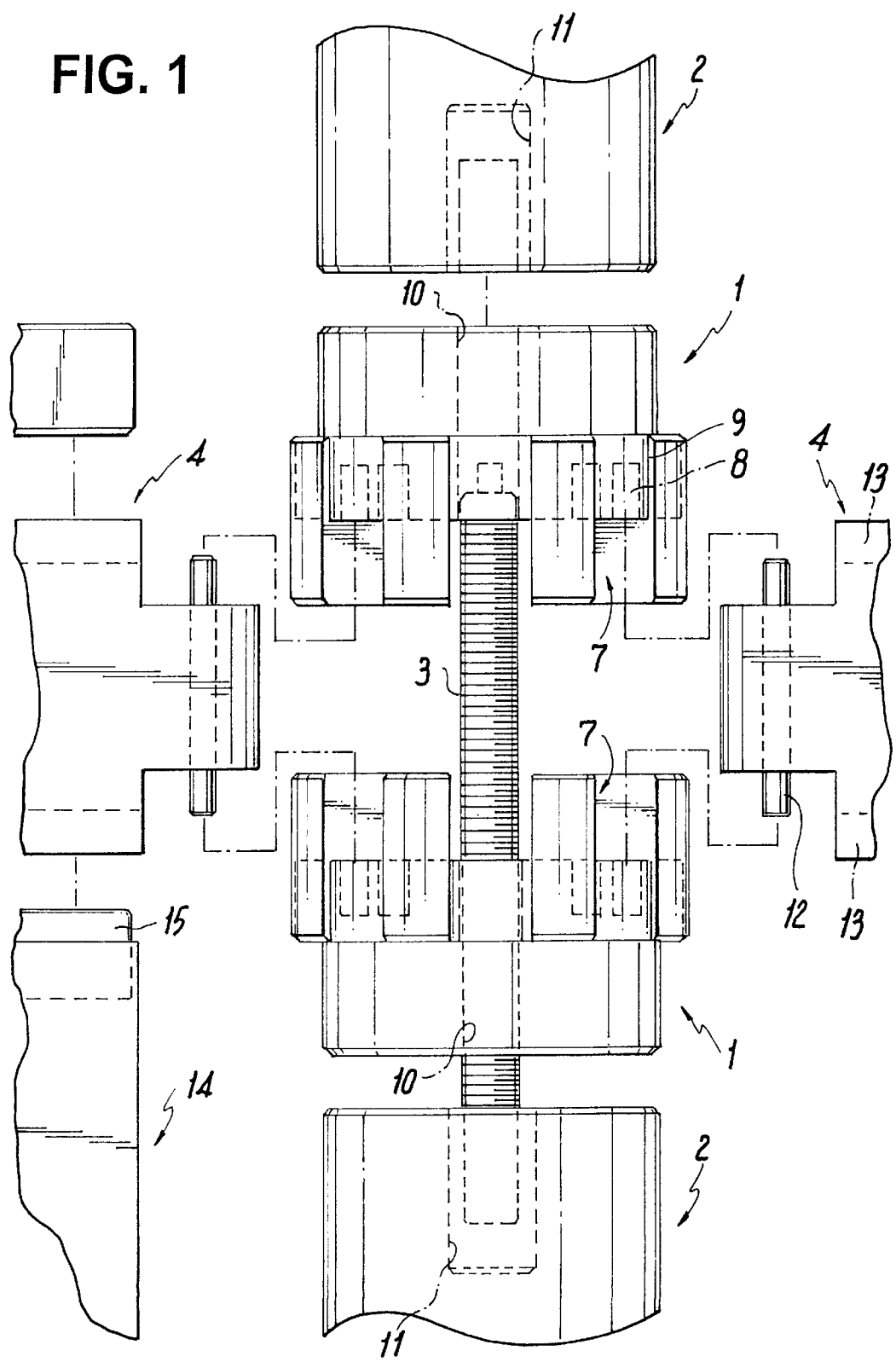
FIG. 1 shows the design principle of the connection system comprising connector, frame elements and supports by means of the elements prepared for assembly.
Figure 2:
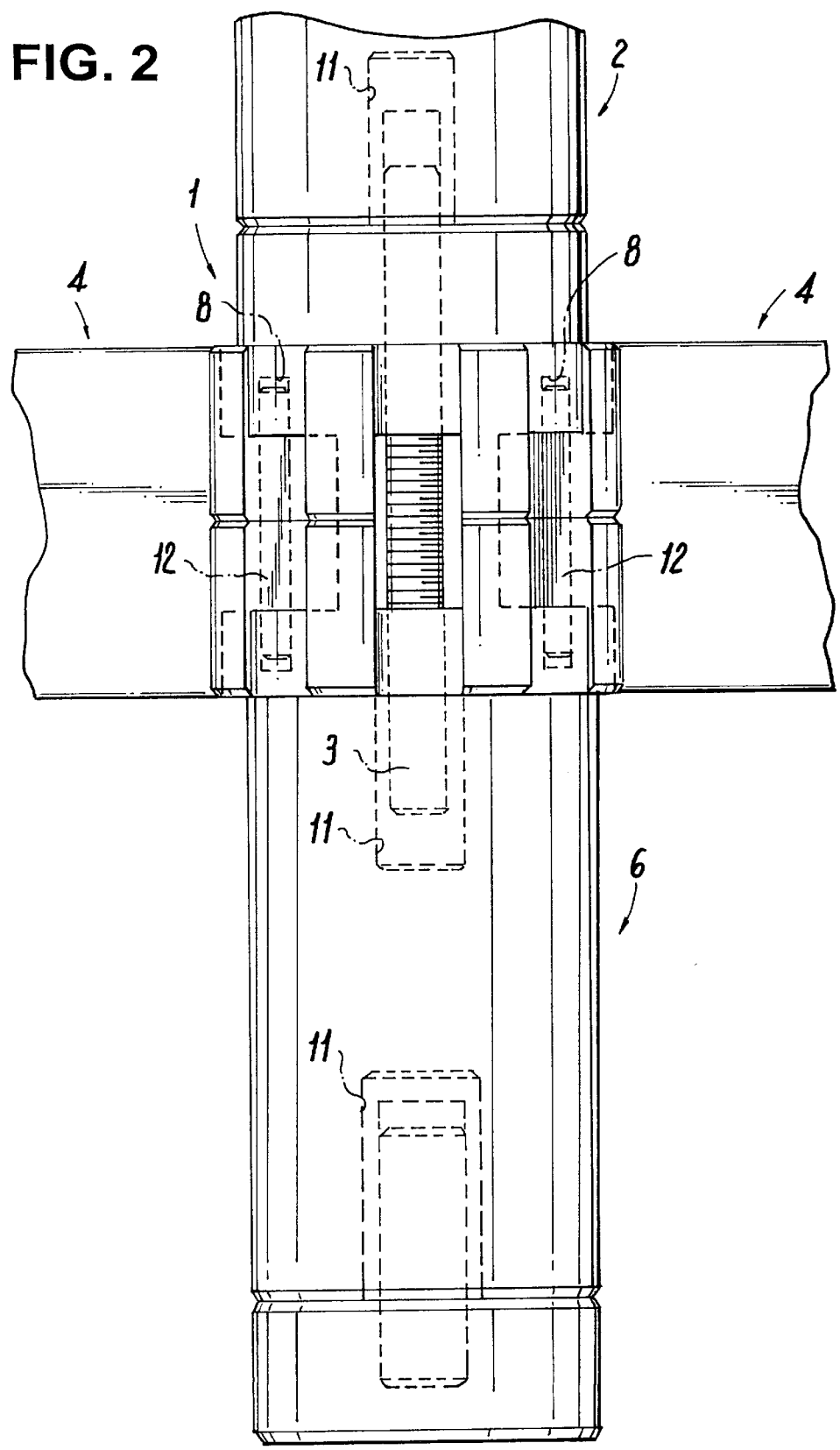
FIG. 2 shows the overall view of an assembled connection according to FIG. 1.

FIGS. 1 and 2 show the design principle of the connection system in the range of a connection joint. The fundamental element is a vertically adjustable base element 6 with the integral lower half of the connector 1. This half takes in its notch 7 and bore 8 the frame member 4 by means of the dowel 12 (as locking element). The connection screw 3 is screwed in the threaded bushing 11 of the base element 6 and the upper half of the connector 1 is pushed on through the hole 10. The support 2 is turned on the connection screw 3 by means of the inserted threaded bushing 11. The longitudinal grooves 9 prevent any tilting of the frame elements 4, and the frame elements 4 anchored now in the connector 1, are pressed between the base element 6 and the support 2 by means of the connection screw 3 reaching angular stability.

Then the assembly operation is repeated by screwing the connection screw 3 into the threaded bushing 11 of the support 2 and pushing-on the lower half of the connector 1. After inserting the panel element 14 into the groove 13 of the lower frame member 4 by means of the tongue 15, the upper frame member 4 is pushed into the lower half of the connector 1 and on the tongue 15 of tile plate element 14, the upper half of the connector 1 is pushed on and screwed by force. The connection element 5 (FIG. 5) completes the construction on top.

Figure 3A:
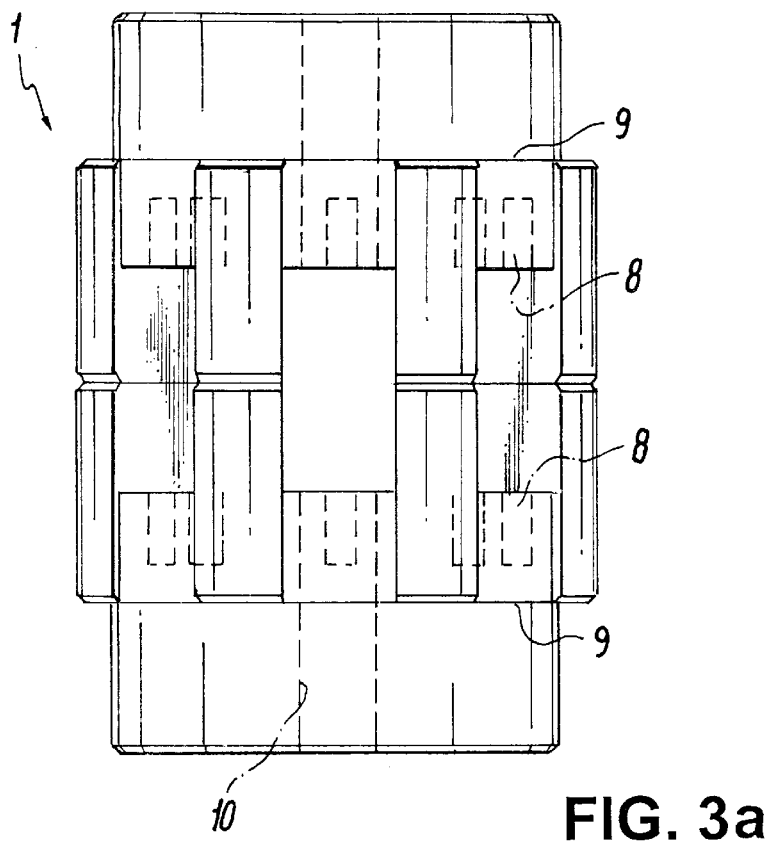
Figure 3B:
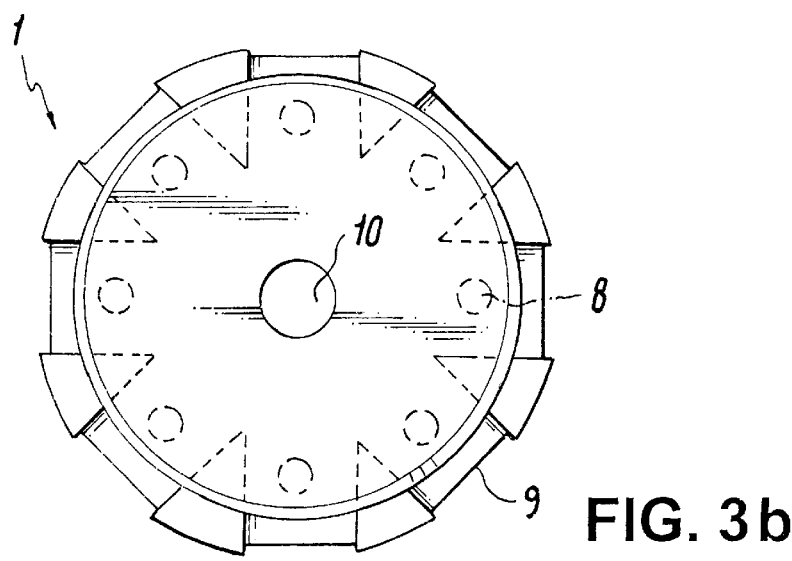
Figure 4:
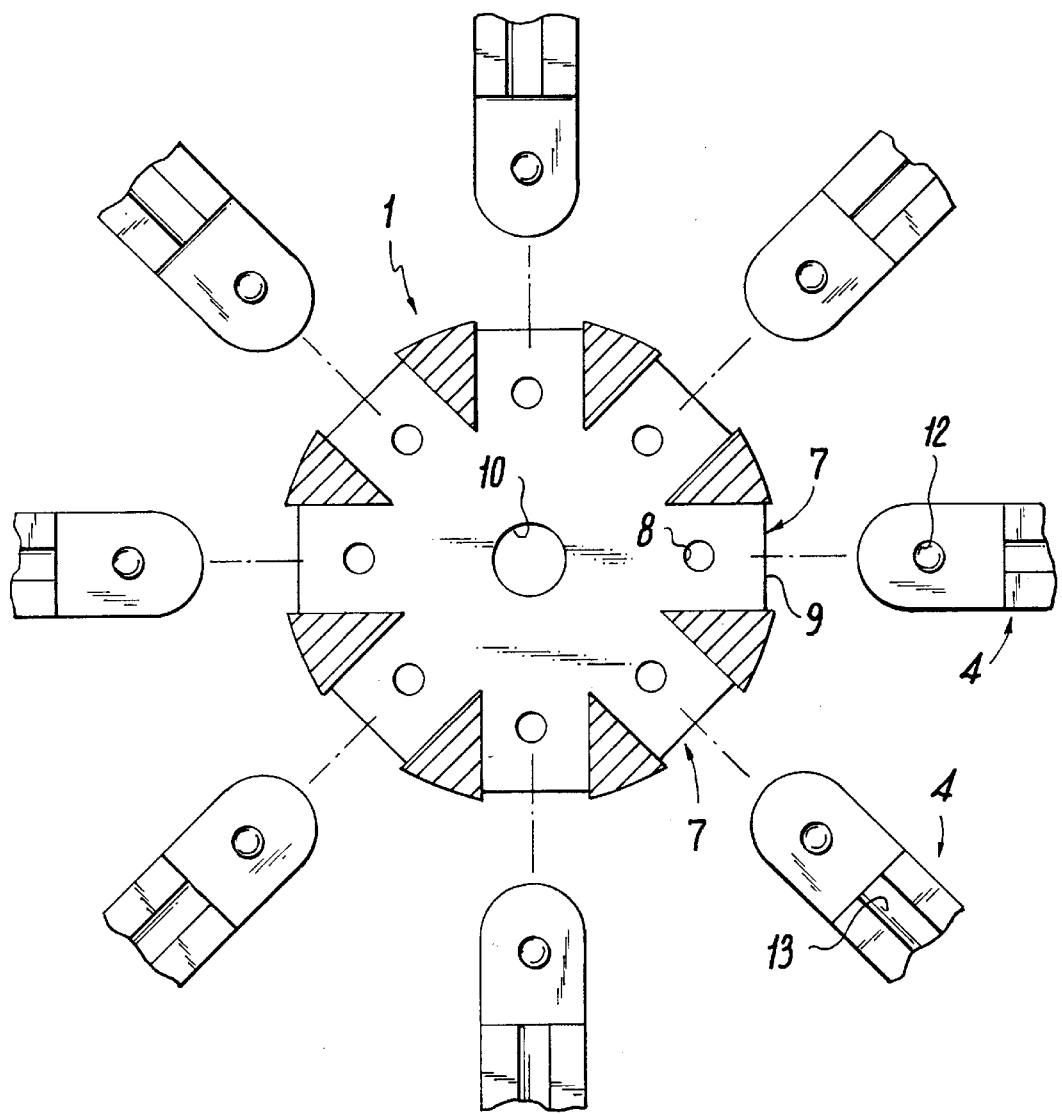
FIG. 4 shows the inner sides of the horizontally divided connector with 8 radial junctions to accomodate the frame elements.
Figure 5:
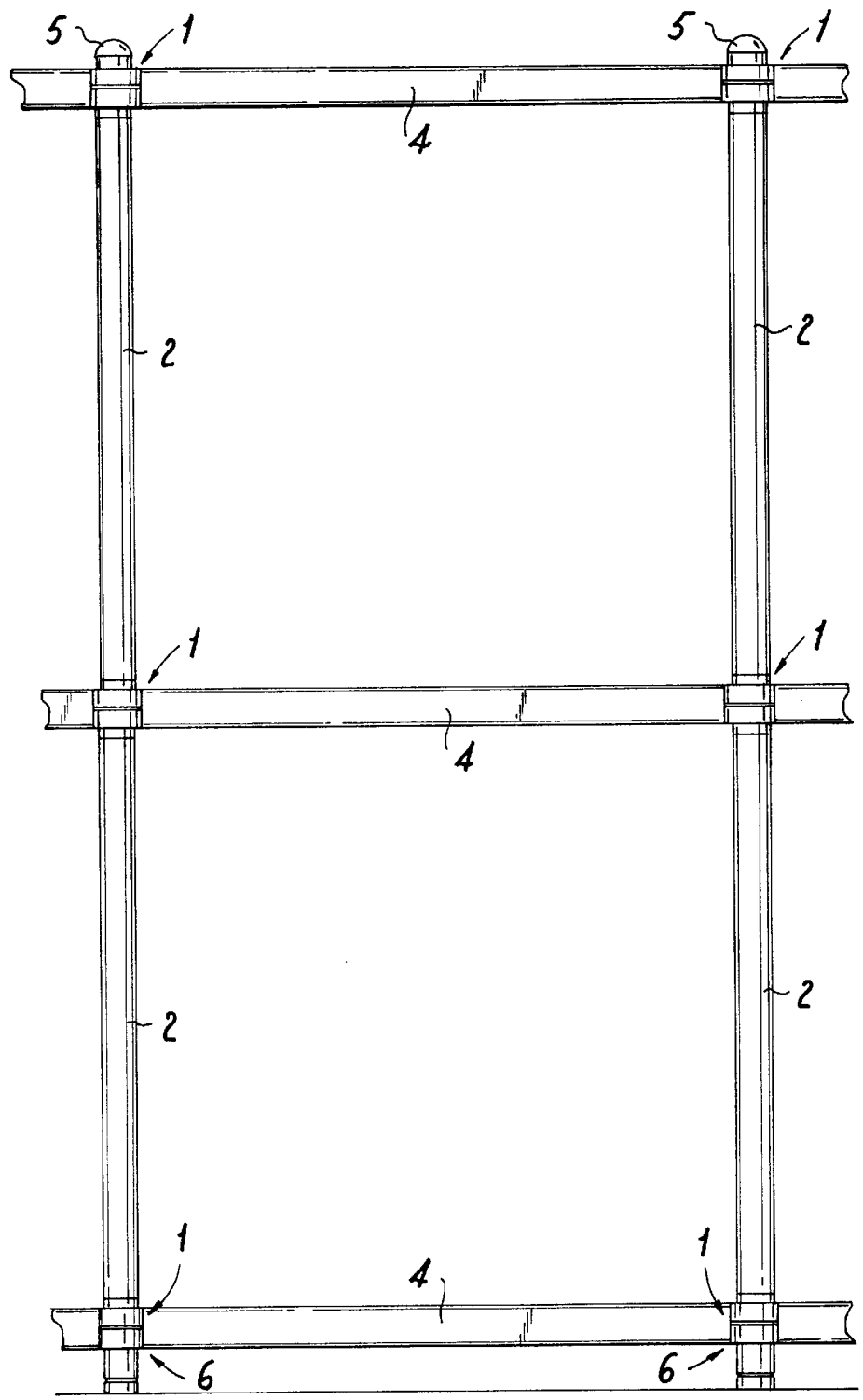
FIG. 5 shows an assembled segment of the framework of the connection system according to the invention.
Figure 6A:
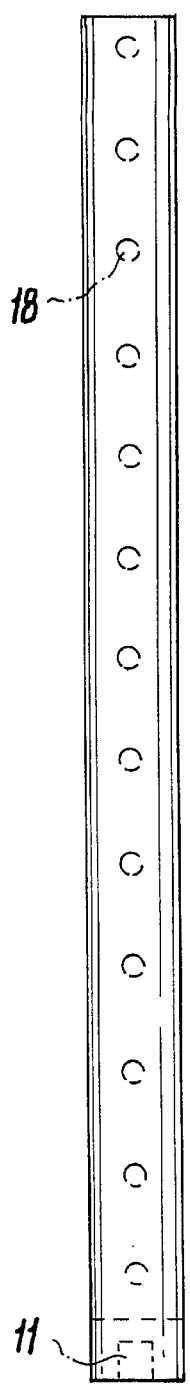
FIGS. 6A–6I shows the functional support and the one-sided console with detailed views of the connection of the two components.
Figure 6B:
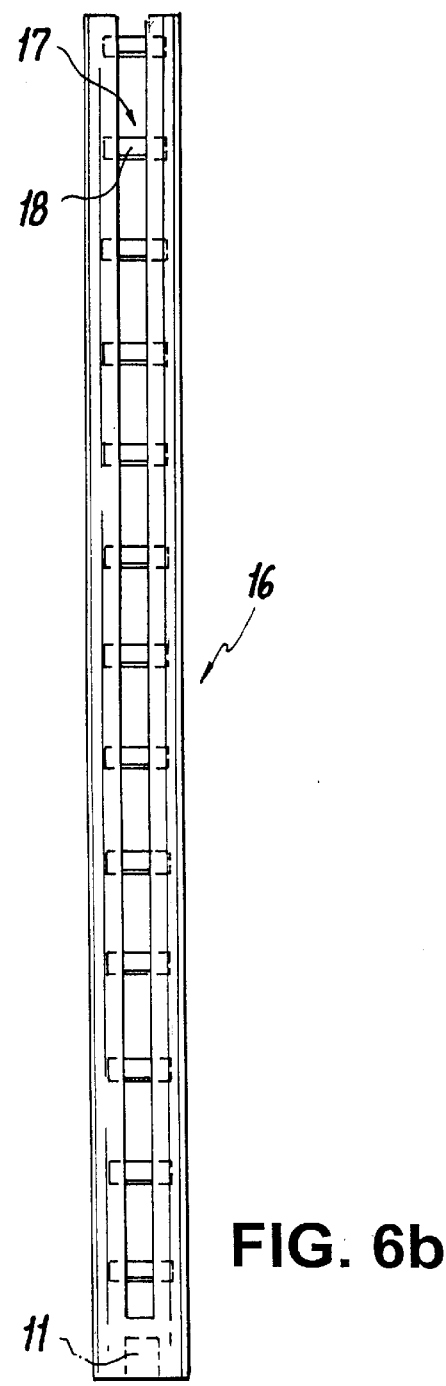
Figure 6C:
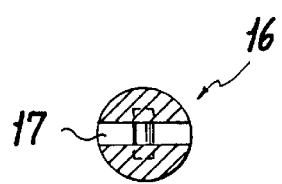
Figure 6D:
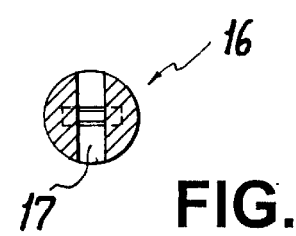
Figure 6E:
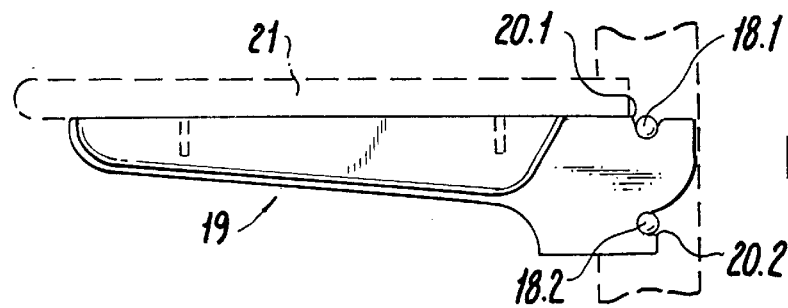
Figure 6F:
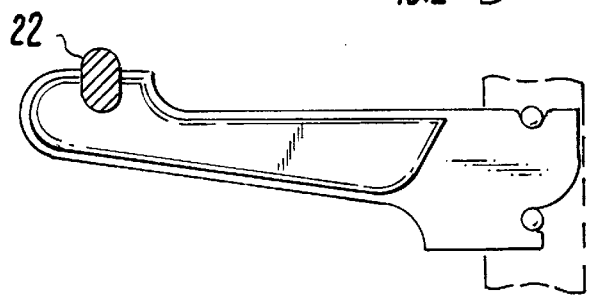
Figure 6G:
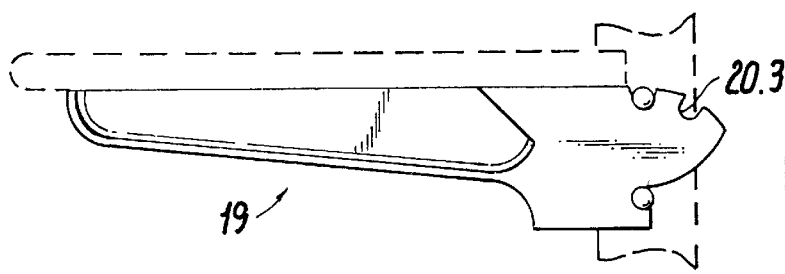
Figure 6H:
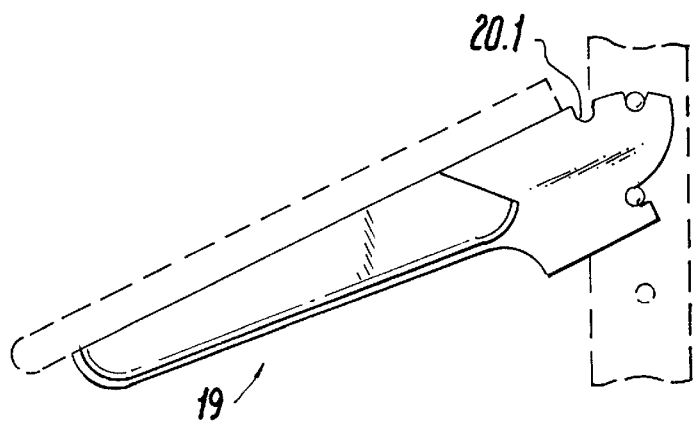
Figure 6I:
Figure 7A:
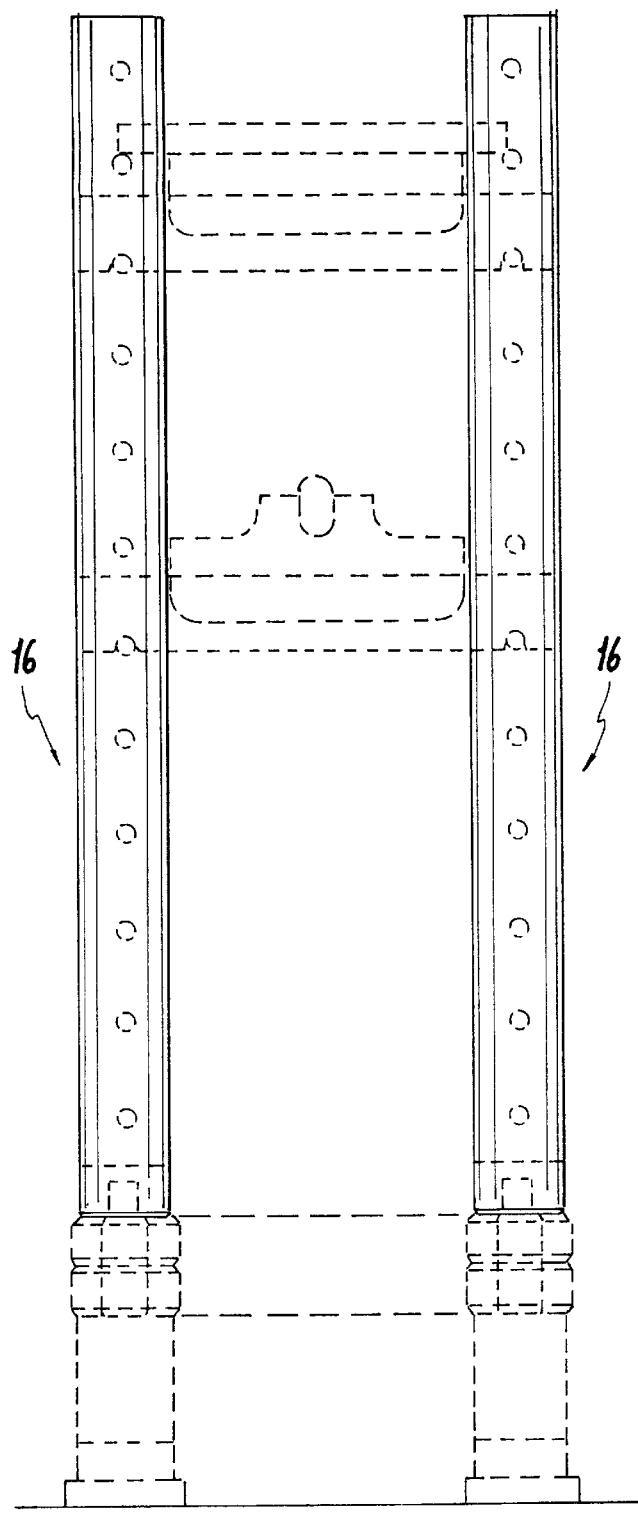
FIGS. 7A–7G shows an assembly unit including two functional supports and two-sidedly suspended consoles.
Figure 7B:
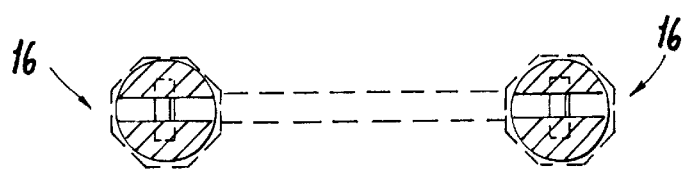
Figure 7C:
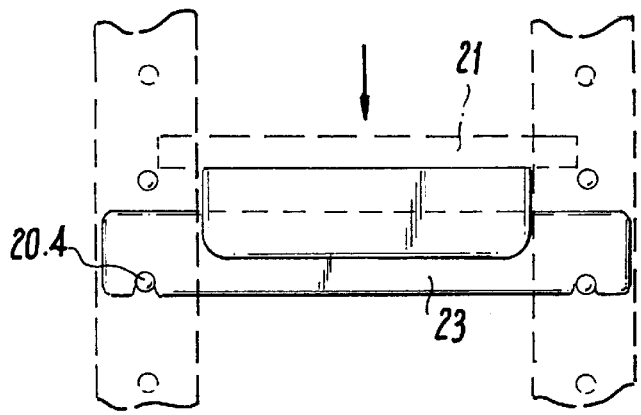
Figure 7D:
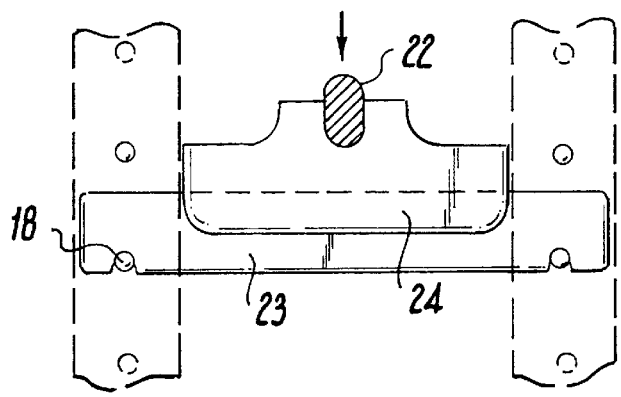
Figure 7E:
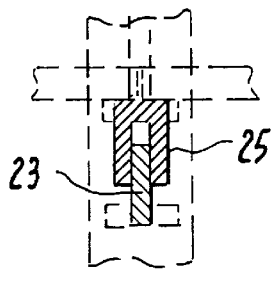
Figure 7F:
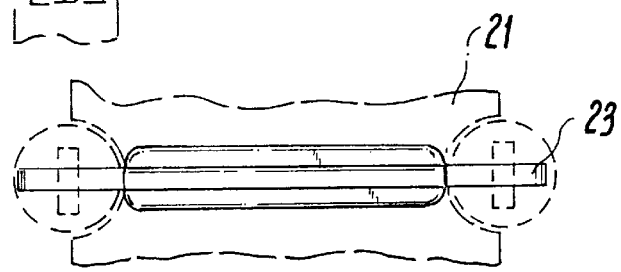
Figure 7G:
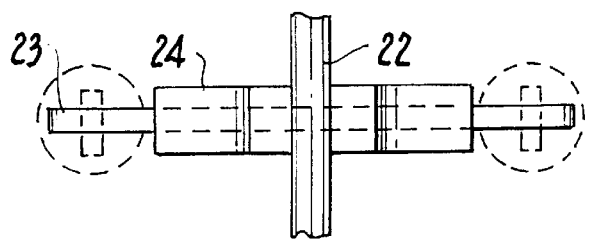

FIGS. 3 and 4 present the invention by its details with proportioned dimensions; FIG. 5 shows an assembled segment of the framework.

In this embodiment the diameters of connector 1 and support 2 are approx. 60 mm; the diameter of the connector 1 in the connection zone is 70 mm, the length of the connector 1 in assembled condition is 100 mm, the cross-sections of the frame members 4 are approx. 30 mm×15 mm or 60 mm×15 mm, respectively, the diameter of the vertical through hole 10 is 11 mm and of the bore 8 is approx. 4 mm.

The connector 1 is made as a standard component and has always 8 joints for frame members. In specialty designs the connector 1 has only the required number of joints. The connection screw 3 should be made of plastics or metal, the threaded bushing 11 of plastics. The system parts of the wooden framework are, as a rule, natural wood, they may be stained in RAL colours.

The plate elements 14 are made of plastics, metal, glass or wood, depending on the application. Frame structures are possible.

Figure 8A:
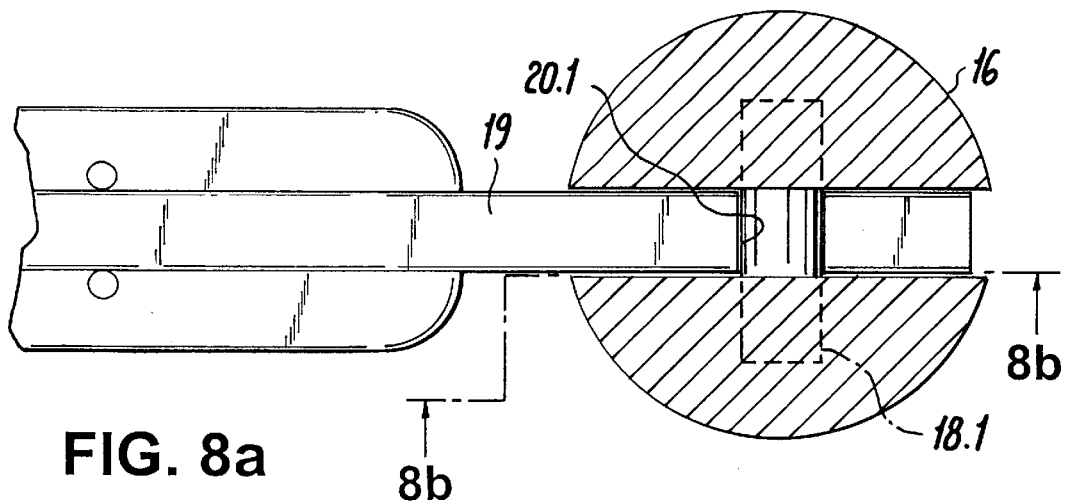
FIGS. 8A and 8B shows a detailed view concerning the assembly of the one-sidedly suspended console.
Figure 8B:
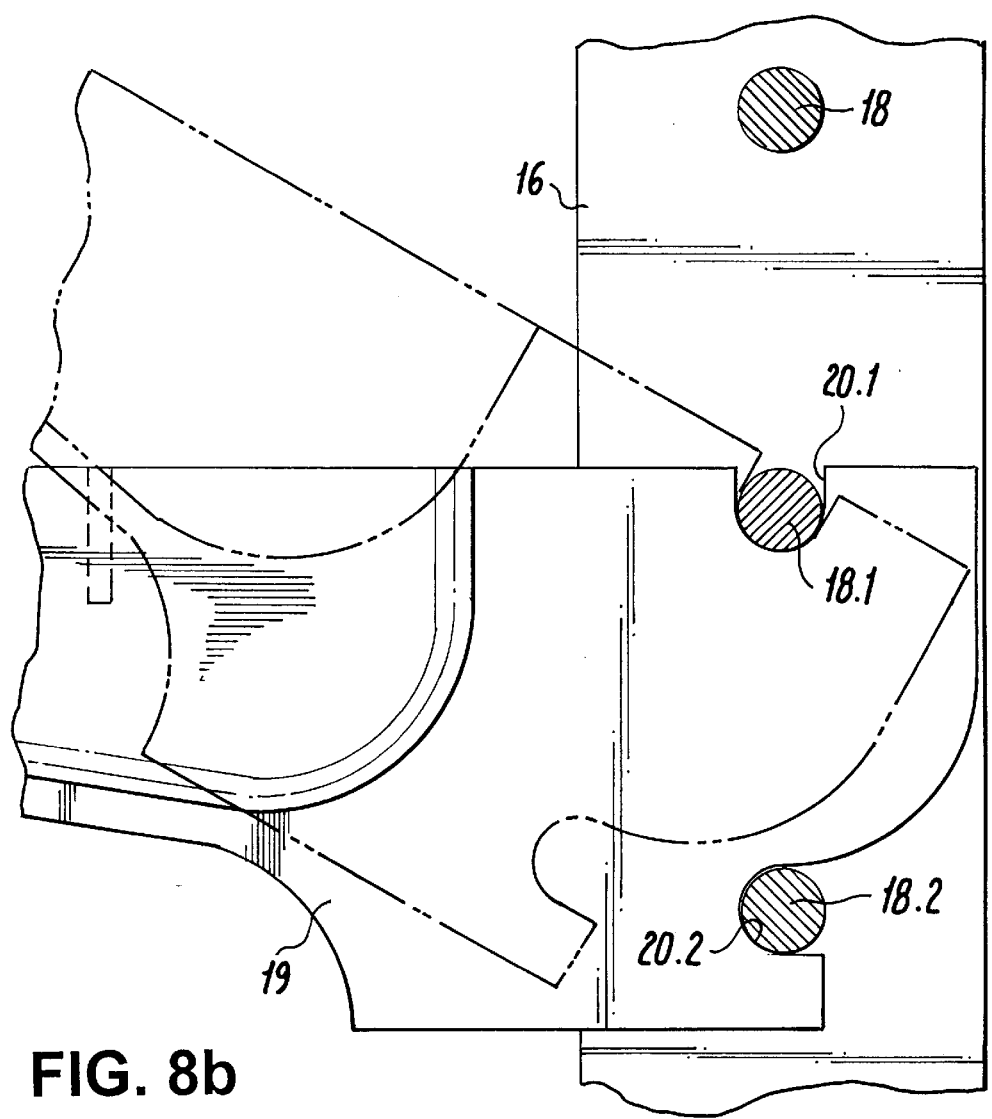

The functional supports 16 and consoles 19, 23 chosen for the example of embodiment in FIG. 6 to 8, are made of wood; the functional supports 16 have circular sections.

Of course, other materials and sections may be used.

The functional supports 16 to FIG. 6 are column-shaped with a longitudinal slot 17, which extends over the entire distance of the functional supports 16 between the threaded bushings 11 in both front ends.

The threaded bushings 11 enable a connection (assembly) to the joint elements/connectors 1 not shown, of FIGS. 1 to 5.

To act as pin-like couplers 18 dowels are inserted in grid distances of say, 60 mm. These dowels 18 are, for vertical position of the functional supports 16, horizontal and vertical to the section plane of the support halves and in this way, connect the two halves of the functional supports 16 in a defined distance.

The width of the longitudinal slot 17 depends on the thickness of the consoles 19 and 23 and is, for example, approx. 13 mm for a support diameter of 60 mm and a console thickness of 12 mm.

The one-sidedly suspended console 19 has in a first form of embodiment, see also FIG. 8, on the assembly side two indents 20.1 and 20.2, which in connection with the shape of the assembly side of the console, evident from FIGS. 6 and 8, ensure an easy mounting between two adjacent dowels 18 in the longitudinal slot 17 of the functional supports 16. Hanging of the console 19 in the functional supports 16 is done in such a way that the console is slided into the longitudinal slot 17 in a upwards pointing angular position until the upper dowel 18.1 engages with the indent 20.1 and seats, after a rotational movement (tilting downwards) of the console 19 with the indent 20.2 on the lower dowel 18.2.

The functional side of the console 19 opposite to the assembly side, is intended to accomodate supporting elements, as for example shelve 21, clothing rail 22 and cabinet components.

In a second design of embodiment, see FIG. 6, the console 19 has three indents 20.1, 20.2 and 20.3 on the assembly side and is designed such that it can be positioned in two different angular positions, for example 90° to the functional support 16, or 30° to the horizontal.

In the chosen example of embodiment, the diameter of the dowel 18 is 12 mm and the diameter of the indents is approx. 13 mm.

FIG. 7 presents the console 23 which is two-sidedly suspended in two functional supports 16. Both ends of this console 23 are assembly sides and each end of the console 23 has on its lower side an indent 20.4.

The console 23 is assembled by pushing it through or into, respectively, the longitudinal slot 17 of both functional supports 16 and changing the distance of these functional supports 16 until the indents 20.4 engage with the associated dowels 18.

The free length of the console 23 can carry riding elements 24, which ensure the height balance as well as they fulfill certain functions. Such functions are, in particular, the enhancement of the stability of the console 23 or the coupling to supporting elements as, for example, shelves 21 and clothes rails 22.

The riding elements 24 are connected to the console 23, for example, by means of a groove 25 in the lower side of the riding elements. The riding element 24 is slided onto the upper side of the console 23 by means of this groove 25.

Figure 9:
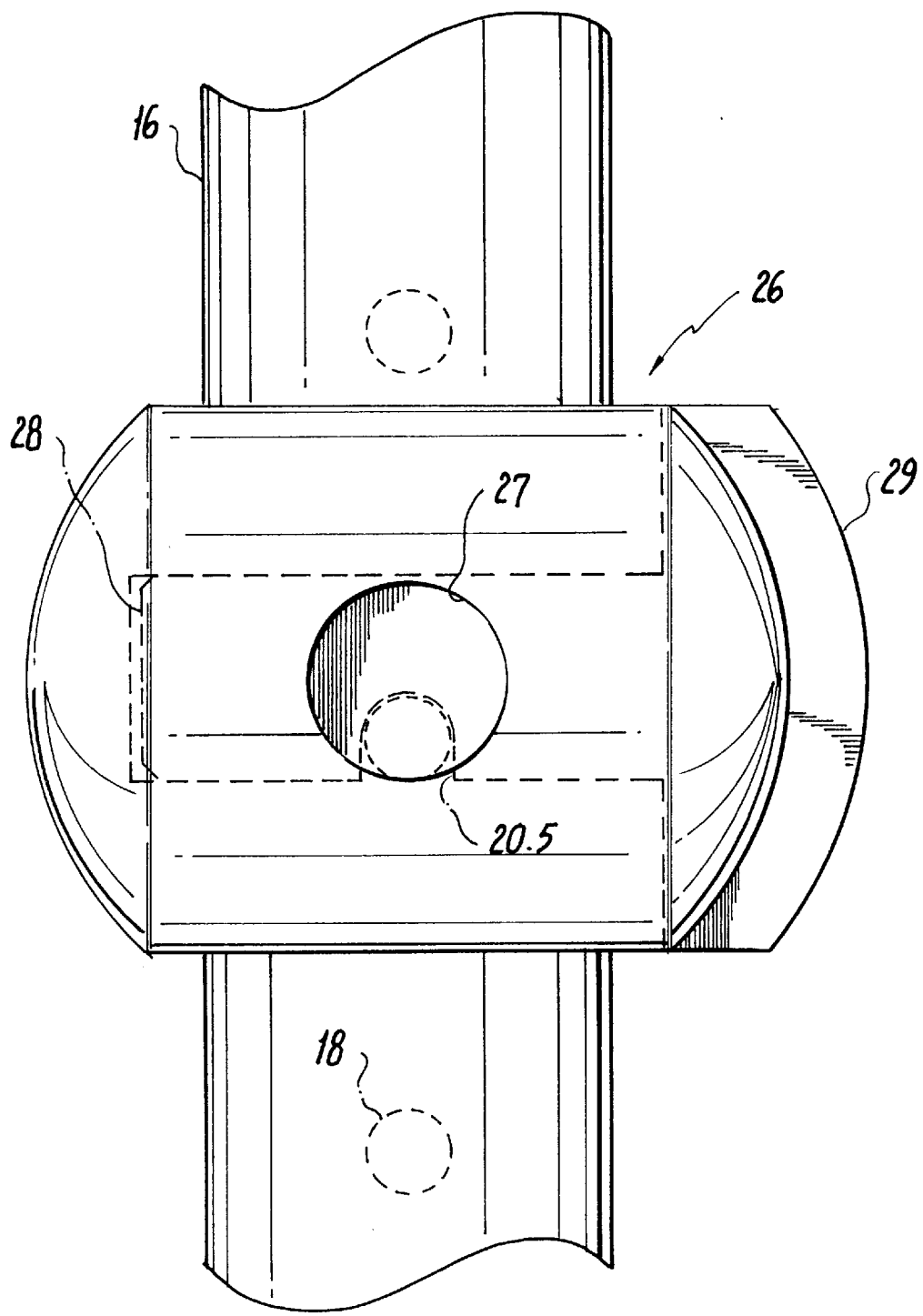
FIG. 9 shows the ring mount sitting on the functional support and enclosing it.
Figure 10:
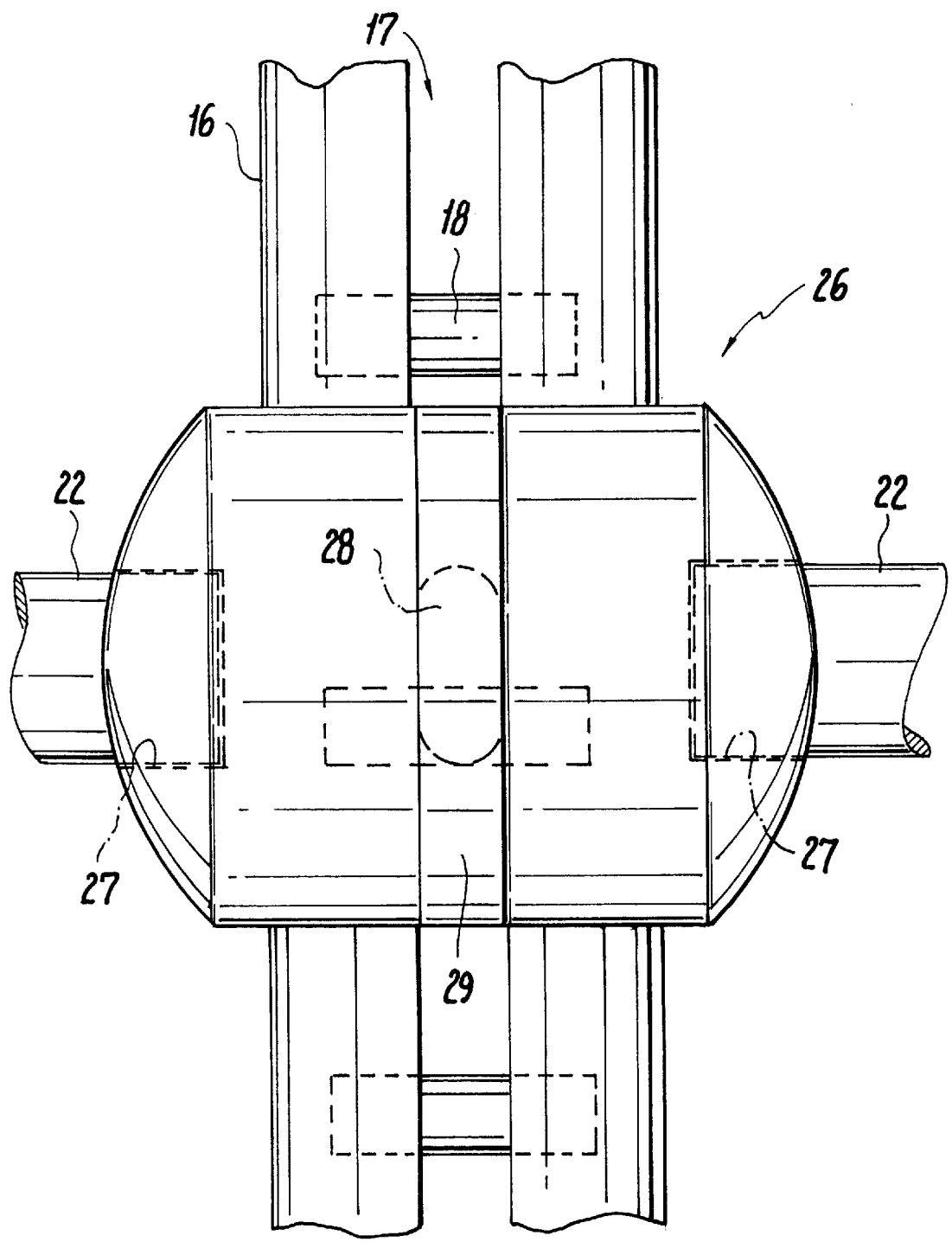
FIG. 10 shows the ring mount of FIG. 9 rotated 90°.

FIGS. 9 and 10 show the vertically adjustable ring mount seated, as a punctual supporting element, on the functional support 16. When the bolt 28 is pushed out by the bolt handle 29 the ring mount slides, guided by the enclosed functional support 16, and can be moved up or down into the desired position on the functional support.

In order to lock the ring mount 26 the bolt 28 is pushed radially into the ring mount until the indent 20.5 on the lower side of the bolt engages with the dowel 18 provided on the appropriate height level. In this assembled position, the bolt 28 passes transversely through the longitudinal slot 17 of the functional support 16 and engages with the recess of the ring mount 26 on the opposite side of the bolt handle. Bores 27 are in the wall of the ring mount 26 in which, for example, clothes rails 22 or any other rail can be put.

In FIGS. 8 and 9, two bores 27 exist which are provided in the ring mount 90° to the bolt plane.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A connection system for constructing accommodation units, assembled furniture, and complex shelving, storage and display configurations for interior design plans and exhibitions, the connection system comprising:

a laterally extending first frame member (4) having a first frame member resting end;

a first connector (1) having an upper and a lower half separable to receive the first frame member resting end, the first connector having a longitudinal axis and a connection screw (3) extending through said upper and lower half along the longitudinal axis, the connection screw having an upper end extending from the upper half of the first connector and a lower end extending from the lower half of the first connector;

a first support (2) positioned below the connector, the first support having an upper end with a threaded bushing sized to receive in threaded engagement the lower end of the connection screw of the first connector;

a second support (2) positioned above the connector, the second support having a lower end with a threaded bushing sized to receive in threaded engagement the upper end of the connection screw of the first connector;

wherein:

(a1) a lower end of the upper half of the first connector has a downwardly and outwardly opening notch (7) with a downwardly opening bore (8) in an upper end of the notch, and a longitudinal groove (9) in an outer surface of the upper half of the first connector, the longitudinal groove extending upwardly from the upper end of the notch;

(a2) an upper end of the lower half of the first connector has an upwardly and outwardly opening notch (7) with an upwardly opening bore (8) in a lower end of the notch, and a longitudinal groove (9) in an outer surface of the lower half of the first connector, the longitudinal groove extending downwardly from the lower end of the notch;

(a3) a locking element (12) having an upwardly projecting portion and a downwardly projecting portion is provided on the first frame member resting end; and (a4) the notch, bore and longitudinal groove of the upper half of the first connector and the notch, bore and longitudinal groove of the lower half of the first connector are longitudinally aligned and dimensioned to closely receive the first frame member resting end such that the upwardly projecting portion of the locking element is received in the downwardly opening bore, and the downwardly projecting portion of the locking element is received in the upwardly opening bore; and (b) wherein tightening the connection screw in the respective threaded bushing of the upper end of the first support and the threaded bushing of the lower end of the second support clamps the first frame member resting end between the upper and lower half of the first connector; and (c) wherein at least one of the first and second supports is a functional support (16) having a length and having a longitudinal slot (17) vertically halving the functional support over at least a portion of the length of the functional support, and a coupler (18) connecting opposite walls of the longitudinal slot, the longitudinal slot dimensioned to receive a supporting portion of a console, the supporting portion of the console adapted to be supported on the coupler.

2. The connection system of claim 1 wherein the second support is a connection element (5) having a free upper end such that the connection system is completed at a top end.

3. The connection system of claim 1 wherein the first support is a vertically adjustable base element.

4. The connection system of claim 1 wherein the second support has an upper end with a threaded bushing, and the connection system further comprises:

a second connector positioned above the upper end of the second support, and a third support positioned above the second connector, the second connector (1) having an upper and a lower half separable to receive a frame member resting end of a laterally extending second frame member, the second connector having a longitudinal axis and a connection screw (3) extending through said upper and lower half along the longitudinal axis of the second connector, the connection screw of the second connector having an upper end extending from the upper half of the second connector and a lower end extending from the lower half of the second connector, the second support upper end threaded bushing sized to receive in threaded engagement the upper end of the connection screw of the second connector, and the third connector having a lower end with a threaded bushing sized to receive in threaded engagement the upper end of the connection screw of the second connector, wherein (a1) a lower end of the upper half of the second connector has a downwardly and outwardly opening notch (7) with a downwardly opening bore (8) in an upper end of the notch, and a longitudinal groove (9) in an outer surface of the upper half of the second connector, the longitudinal groove extending upwardly from the upper end of the notch;

(a2) an upper end of the lower half of the second connector has an upwardly and outwardly opening notch (7) with an upwardly opening bore (8) in a lower end of the notch, and a longitudinal groove (9) in an outer surface of the lower half of the second connector, the longitudinal groove extending downwardly from the lower end of the notch;

(a3) a locking element (12) having an upwardly projecting portion and a downwardly projecting portion is provided on the frame member resting end of the second frame member; and (a4) the notch, bore and longitudinal groove of the upper half of the second connector and the notch, bore and longitudinal groove of the lower half of the second connector are longitudinally aligned and dimensioned to closely receive the frame member resting end of the second frame member such that the upwardly projecting portion of the locking element is received in the downwardly opening bore of the second connector, and the downwardly projecting portion of the locking element is received in the upwardly opening bore of the second connector; and (b) wherein tightening the connection screw of the second connector in the respective threaded bushing of the upper end of the second support and the threaded bushing of the lower end of the third support clamps the frame member resting end of the second frame member between the upper and lower half of the second connector.

5. The connection system of claim 4 wherein the third support is a connection element (5) having a free upper end such that the connection system is completed at a top end.

6. The connection system of claim 4 wherein the first support is a vertically adjustable base element.

7. The connection system of claim 4 wherein the first frame member has a first length and the first support has a length equal to the first length, the second frame member has a second length and the second support has a length equal to the second length, and wherein the first length is an integer multiple of the second length.

8. The connection system of claim 1 wherein the frame member has a top edge and a bottom edge, the top edge has an upwardly opening groove dimensioned to receive a downwardly directed tongue extending from a first plate element, and the bottom edge has a downwardly opening groove dimensioned to receive an upwardly directed tongue extending from a second plate element.

9. The connection system of claim 1 wherein the longitudinal slot halves the functional support over at least a portion of the length of the functional support such that the slot opens to opposite sides of the functional support, and wherein the supporting portion of the console can be received in the slot from either of the opposite sides of the functional support to which the slot opens.

10. The connection system of claim 1 wherein the coupler is a pin.

11. The connection system of claim 1 wherein the opposite walls of the longitudinal slots are connected by at least two couplers, and the supporting portion of the console has two corresponding indents sized to be received on the at least two couplers such that the console is supported on the at least two couplers.

12. The connection system of claim 1 wherein the opposite walls of the longitudinal slots are connected by at least two couplers, and the supporting portion of the console has at least three indents, each indent sized to receive one of the at least two couplers, the indents positioned on the supporting portion of the console such that the console is supported at a first angle when a first pair of the at least three indents engages the at least two couplers, and the console is supported at a second angle when a second pair of the at least three indents engages the at least two couplers.

13. The connection system of claim 1 wherein the supporting portion of the console has a single indent sized to be received on the coupler.

14. The connection system of claim 1 further comprising a free length extending from the supporting portion of the console, and a riding element supported on the free length of the console such that an accessory support can be supported on the riding element.

15. The connection system of claim 14 wherein the accessory support is a clothes rod.

16. The connection system of claim 14 wherein the accessory support is a shelf.

17. The connection system of claim 14 wherein the riding element has a lower side with a groove sized to engage an upper edge of the free length of the console.

18. The connection system of claim 1 further comprising a ring mount having a body that encircles at least a portion of a cross-section of the functional support, the body having a seating bore for accommodating an accessory support, the ring mount having a removable transverse bolt for insertion into the longitudinal slot of the functional support such that the transverse bolt engages the coupler to support the ring mount on the functional support.

19. The connection system of claim 18 wherein the accessory support is a rail.

20. The connection system of claim 18 wherein the transverse bolt has a handle end and a free end, and the free end extends through the longitudinal slot to engage a side of the ring mount opposite the handle end of the transverse bolt.

* * * * *

UNITED STATES PATENT AND TRADEMARK OFFICE
CERTIFICATE OF CORRECTION

PATENT NO.    :    5,957,614
DATED         :    September 28, 1999
INVENTOR(S)   :    Winfried AURICH It is certified that errors appear in the above-identified patent and that said Letters Patent is hereby corrected as shown below:

Title page, insert item

--[30], Foreign/PCT Application Priority data

September 23, 1994   Germany.............................G94 15 786.3U

September 8, 1995   Germany.............................295 14 424.6--.

Signed and Sealed this

Thirty-first Day of October, 2000

*Attest:*

*Attesting Officer*

Q. TODD DICKINSON

*Director of Patents and Trademarks*